United States Patent [19]

Watley

[11] 4,249,035
[45] Feb. 3, 1981

[54] ELECTRICAL OUTLET BOX

[76] Inventor: Jerry O. Watley, Box 543, Cassville, Mo. 65625

[21] Appl. No.: 122,387

[22] Filed: Feb. 19, 1980

[51] Int. Cl.³ .............................................. H05K 5/00
[52] U.S. Cl. .................................. 174/52 R; 174/51; 219/267; 337/1; 339/122 R
[58] Field of Search ................... 174/50, 51, 52 R; 339/10, 121, 122 R, 182 R; 337/1; 361/356, 357, 376, 334; 219/267

[56] References Cited

U.S. PATENT DOCUMENTS

| 2,236,435 | 3/1941 | Lockshin |
| 2,239,846 | 4/1941 | Gifford |
| 2,477,013 | 7/1949 | Spencer |
| 2,766,433 | 10/1956 | Fried |
| 2,911,614 | 11/1959 | Davis ............................ 339/182 R |
| 3,309,598 | 3/1967 | Montgomery et al. |
| 3,760,150 | 9/1973 | Fenn ............................ 219/267 X |
| 4,011,000 | 3/1977 | Wharton |

Primary Examiner—B. A. Reynolds
Assistant Examiner—D. A. Tone
Attorney, Agent, or Firm—Henderson & Sturm

[57] ABSTRACT

This invention relates to a device allowing a plurality of electrical devices to be operated from the same power source at one time. The device comprises a compact attractive unit housing a plurality of receptacles for receiving electrical plugs commonly used on automotive accessories. An electrically conductive, and rigid bar runs the length of the box and electrically connects the positive pole of each receptacle while mechanically locating the rear of each receptacle.

An electrically conductive plate runs the length of the box, serving as both the ornamental facing of the box and electrically connecting the negative pole of each receptacle to the ground wire. The current entering the box runs through an automatically resetting circuit breaker, which operates to prevent damage to the system from an overload of current being drawn through the device.

1 Claim, 3 Drawing Figures

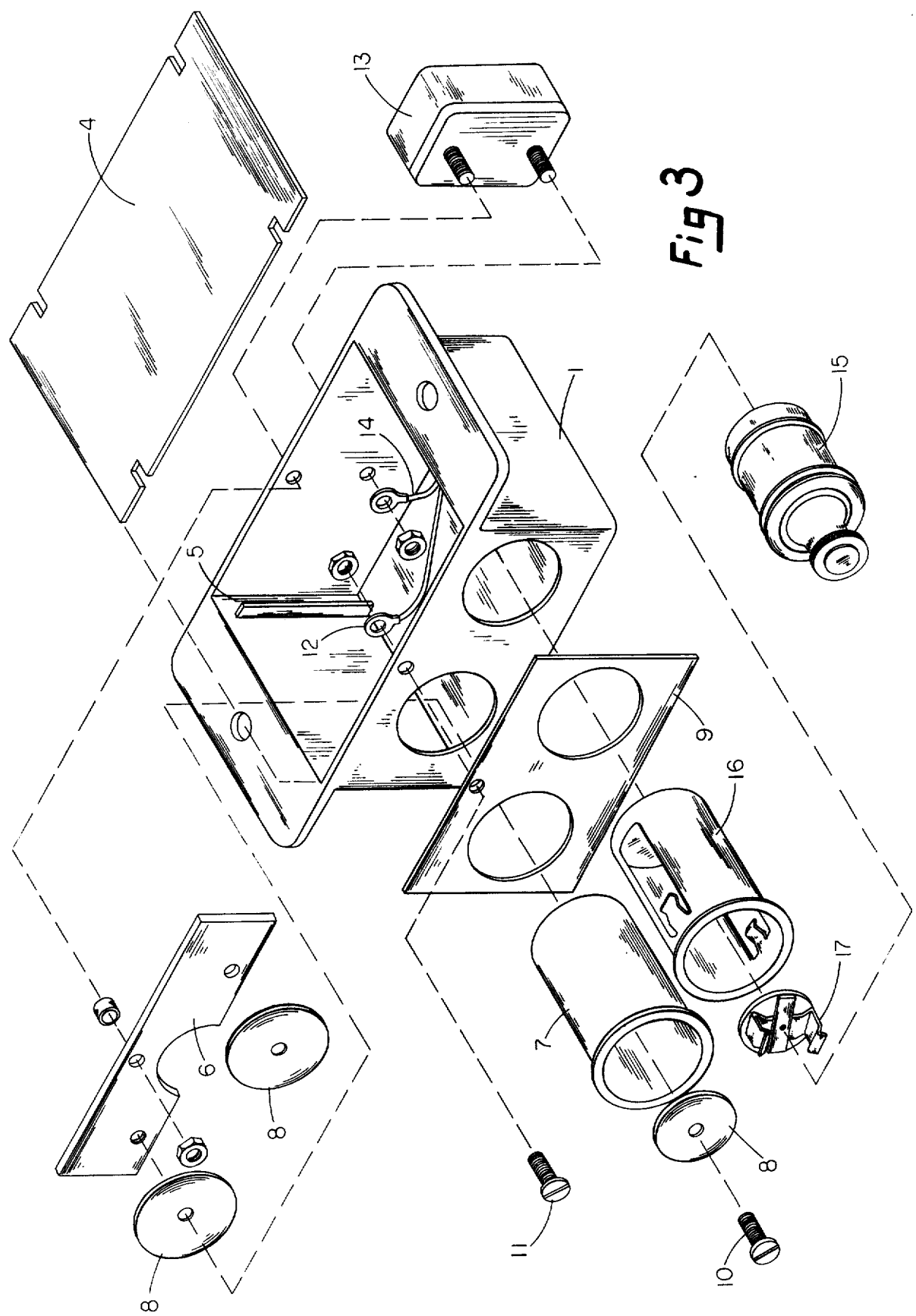

ELECTRICAL OUTLET BOX

BACKGROUND OF THE INVENTION

This invention is primarily for use in motor vehicles but may be successfully employed in any 12 volt direct current electrical circuit, where the simultaneous use of several devices is required.

Those concerned with the problem have usually resorted to a method of wiring the outlets together to form a complete circuit. This method requires the use of many short segments of wire and much labor to assemble the total device. These wires are not able to support and mechanically locate the outlets. Therefore, a separate structure was required to affix the outlet in position. This design lead to a device that was difficult and expensive to assemble because it required a large amount of material and labor to produce.

Another problem encountered by a device which allowed a plurality of electrical devices to be operated simultaneously was the problem of over-heating and electrical overloads. Many of those concerned with this problem resorted to the use of in line fuses which have to be replaced periodically and are inconvenient. Consequently, there is a need for a device which is economical to produce and is free of the bother of fuses.

SUMMARY OF THE INVENTION

The present invention relates to an electrical outlet box for use in twelve volt direct current electrical systems. A non-conductive, rectangular housing is used protecting a rectangular, rigid, conductive bar, located by vertical slots in the ends of the housing. Electrical contacts are placed into the sides of the bar and are the source of current picked up by any electrical accessory connected to the device. A conductive sleeve is incorporated to receive the current returning from the accessory and seeking ground. The sleeve and the bar are insulated from each other by a resilient insulating device which allows the electrical contact means to mechanically locate the rear end of the sleeve to the bar without shorting the circuit. A conductive plate collects the current from the conductive sleeves and a second contact means transmits the current to the ground wire. A circuit breaker is incorporated in the circuit where the current first enters the outlet box to interrupt the circuit when more than a predetermined current is drawn into the device.

An object of the present invention is to provide an improved electrical outlet box.

Another object of the invention is to provide an outlet box of a design allowing a plurality of outlets.

A further object of the invention is to provide an outlet box which is economical to assemble by designing its components to serve as many functions as possible.

A further object of this invention is to provide an outlet box which is safe to use by incorporating an automatic circuit breaker to disengage the flow of electricity should too much current be drawn into the device.

A further object of this invention is to provide an outlet box which does not require internal wiring and excessive labor to assemble.

Still another object of the invention is to provide an outlet box of the general type characterized above which is simple and economical yet dependable and durable.

Other objects, advantages and novel features of the invention will become apparent from the following detailed description of the invention when considered in conjunction with the accompanying drawings.

BRIEF DESCRIPTION OF THE DRAWINGS

FIG. 3 is an exploded perspective view of the device shown in FIGS. 1 and 2.

DESCRIPTION OF THE PREFERRED EMBODIMENT

Figure 1:
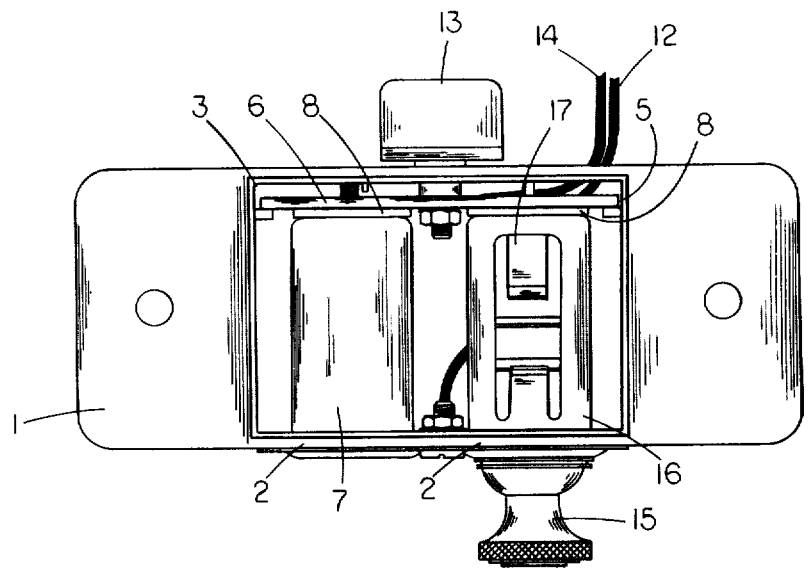
FIG. 1 is a top elevation view of a preferred embodiment of the present invention.

FIG. 1 shows a non-conductive housing 1 made of plastic. Entry means 2 are provided in the front side of the housing to allow entry of conductive sleeves. An access means 3 is provided in the top wall of the housing. (A cover plate 4 is provided to cover the access means 3.) The housing 1 is provided with slots 5 in the end walls to locate the conductive bar 6. Conductive sleeves 7 are shown running through the entry means 2 and to the bar 6. An insulator 8 is shown between the conductive sleeve 7 and the bar 6.

FIG. 1 also illustrates the placement of a standard cigar lighter 15, a standard cigar lighter sleeve 16 and a standard cigar lighter clip 17.

Figure 2:
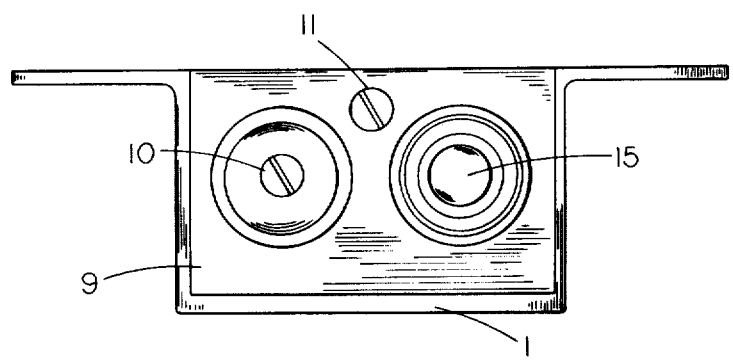
FIG. 2 is a front elevational view of the preferred embodiment of the present invention.

Referring now to FIG. 2, a conductive metal plate 9 is shown. This plate has holes which align with the entry holes 2 provided in the housing 1. The conductive sleeves 7 are shown inserted in the said entry hole 2 and through the corresponding holes in the metal plate 9. An electrical contact screw 10 is provided in the center of each conductive sleeve 7. This contact serves to allow the pickup of electricity from the bar 6 and affixes the aft end of each conductive sleeve to the bar 6. An insulator 8 is shown inside each conductive sleeve and prevents electrical contact between the sleeve 7 and the contact 10. This insulator is held in place by the contact screw 10. A contact screw 11 electrically connects the plate with the ground wire 12.

Referring now to FIG. 3, the incorporation of the circuit breaker 13 is shown. All the current from the current wire 14 passes into the circuit breaker 13 and then is conducted to the bar 6 unless the current load exceeds the predetermined amount set into the device, in which case the current is interrupted by the circuit breaker 13.

FIG. 3 also illustrates how the device is assembled. The conductive sleeves 7, the insulators 8, the conductive plate 9 and the bar 6 are all held in place by the contact screws 10. These screws, when tightened, pull the conductive sleeves 7 snugly into the entry means 2, which locates the conductive plate 9. The screw holds the insulators 8 in place and pull the conductive bar 6 snugly against the slots 5, thereby allowing a simple, efficient means for construction of the device.

Accordingly, it is believed that all of the objects mentioned above are accomplished by use of the preferred embodiment disclosed herein. Obviously, many modifications and variations of the present invention are possible in light of the above teachings. It is therefore to be understood that, within the scope of the appended claims, the invention may be practiced otherwise than as specifically described.

I claim:

1. An outlet box of a type adapted to receive a current carrying wire and a ground wire said box comprising:
   a non-conductive housing with a top side wall, a bottom side wall, two end walls, a front side wall, and a rear side wall;
   entry means in the front side wall for allowing entry to the interior of said housing;
   access means in the top side wall for allowing access to the interior of said housing;
   a conductive rigid, rectangular bar for conducting electricity, said bar having planar front and back surfaces, and a thickness sufficient for rigidity;
   vertical slot means slidably receiving said bar disposed on said end walls of said housing, whereby said planar front surface of said bar rests against said slot means and faces the front side wall of said housing;
   a plurality of first conductive contact means for allowing the pickup of electricity from said bar, said conductive contact means projecting from to said planar front surface of said bar;
   a plurality of conductive sleeves for receiving electrical current, said conductive sleeves each having a first end and a second end and an interior and an exterior, each said first end being completely open with a lip extending outwardly, perpendicular to the axis of the sleeve, each said second end being substantially closed and having means therein allowing one of said contact means to pass therethrough;
   a first resilient insulating means for preventing the flow of electricity between each of said conductive sleeves and its respective contact means;
   a second resilient insulating means for preventing the flow of electricity disposed between said conductive sleeve and said bar;
   a conductive planar plate electrically connecting said sleeves to each other, said plate having a front surface and a rear surface, said plate being affixed flatly to the exterior of said front sidewall of said housing, and having hole means running from said front surface to said rear surface thereof for being aligned with said entry means;
   second conductive contact means connected to said conductive planar plate for electrically connecting said conductive planar plate to said ground wire; and
   a circuit breaker electrically connected to said bar for electrically connecting the current carrying wire to said bar for disconnecting the circuit when more than a predetermined current is drawn therethrough.

* * * * *